(12) United States Patent
Sacerdoti

(10) Patent No.: US 6,222,540 B1
(45) Date of Patent: *Apr. 24, 2001

(54) USER-FRIENDLY GRAPHICS GENERATOR INCLUDING AUTOMATIC CORRELATION

(75) Inventor: Earl D. Sacerdoti, Alamo, CA (US)

(73) Assignee: Portola Dimensional Systems, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/032,335

(22) Filed: Feb. 27, 1998

Related U.S. Application Data

(63) Continuation-in-part of application No. 08/975,987, filed on Nov. 21, 1997.

(51) Int. Cl.[7] ............................. G06F 3/00; G06F 17/30

(52) U.S. Cl. ..................... 345/339; 345/334; 345/348; 345/349; 345/440; 345/968

(58) Field of Search ................................ 345/334, 339, 345/348–349, 355, 419, 440, 968, 977, 140, 970; 707/2–3

(56) References Cited

U.S. PATENT DOCUMENTS

| 5,136,690 | * | 8/1992 | Becker et al. ...................... 345/349 |
| 5,495,567 | * | 2/1996 | Iizawa et al. ....................... 345/334 |
| 5,581,677 | * | 12/1996 | Myers et al. ........................ 345/440 |
| 5,623,590 | * | 4/1997 | Becker et al. ................... 345/348 X |
| 5,634,133 | * | 5/1997 | Kelley ............................ 345/440 X |
| 5,636,350 | * | 6/1997 | Eick et al. .......................... 345/440 |
| 5,958,012 | | 9/1999 | Battat et al. ........................ 709/224 |
| 6,011,562 | | 1/2000 | Gagne et al. ........................ 345/473 |

OTHER PUBLICATIONS

Peter Coffee, "Make the Numbers Tell a Clearer Story," Windows Sources, v6 n2 p. 66(1), Feb. 1998.*

* cited by examiner

Primary Examiner—Raymond J. Bayerl
Assistant Examiner—X. L. Bautista
(74) Attorney, Agent, or Firm—John L. Rogitz

(57) ABSTRACT

A 3D graphics generation and display application for PCs and laptops in a business environment includes an authoring mode screen which lists database elements sought to be graphically displayed, along with a list of variables pertaining to the database elements. Also, the application presents a menu of graphics attributes, including each of the three spatial dimensions and time, as well as various graphics object attributes, such as color, size, rotation, opacity, intensity, texture, etc. The user determines whether the graphics objects are balls for a scatter plot, bars for a bar chart, pie-shaped elements for a pie chart, or other 3D representation. By clicking on a database variable in the list of variables and dragging it over an attribute on the attribute menu, the user can correlate the database variable with the graphics attribute. When the user correlates a variable to a graphics attribute, the correlation is noted by a legend that is displayed with the menu of attributes. The graphics are displayed in an animated 3D presentation with graphics attributes, including their motion over time, determined by the database variables which have been correlated to the attributes. In an alternate embodiment, the user can simply select variables to be presented, and a programmatic rule interpreter receives the variables and accesses a list of conditional rules to automatically correlate the variables to graphics attributes for presentation thereof.

15 Claims, 11 Drawing Sheets

USER-FRIENDLY GRAPHICS GENERATOR INCLUDING AUTOMATIC CORRELATION

RELATED APPLICATIONS

This application is a continuation-in-part of and claims priority from U.S. patent application Ser. No. 08/975,987, filed Nov. 21, 1997, incorporated herein by reference.

The above-referenced U.S. patent application from which this application claims priority includes a microfiche appendix of a software listing, the copyright to which is retained by the copyright owner. The copyright owner has no objection to the reproduction of the patent document or the patent disclosure as it appears in the files and records of the U.S. Patent and Trademark Office, but otherwise reserves all copyrights whatsoever.

FIELD OF THE INVENTION

The present invention relates generally to computer-implemented graphics programs, and more particularly to generators for easily making animated, multi-dimensional graphics displays for presenting data in an easy to understand visual format.

BACKGROUND

Effective presentation of computer-stored data is essential for many reasons. Among the reasons that effective data presentation is important is that the discovery of data trends and correlations between data variables can be promoted by effective visual presentation of the data being analyzed. Also, an advocate of a particular position might wish to present data in an effective, easy to comprehend format when the data supports the position.

As an example, sales data is routinely stored in databases, and the data can represent particular trends and data variable correlations that might be important for the selling entity to know, e.g., sales by product over time, sales by region over time, sales by salespeople over time, etc. As another example, computer databases might contain information about publicly traded stocks, with the information possibly indicating particular trends and/or correlations between particular stock variables that would be important for investors to know.

From the above discussion, it readily can be appreciated that each tuple or set of tuples in, e.g., stock-related data typically represents a database element. Thus, a single tuple might represent data on a particular stock on a particular day, with a set of tuples representing data on a particular stock over many days. Each tuple might include values for many variables. In the stock context, these variables can include price, earnings, certain ratios, trading volume, and so on, with a large number of potential trend-revealing combinations and correlations being possible among the variables.

Simply presenting the variable values of data tuples in tabular form, however, is often a less than effective way to analyze and/or present data. This is because people do not quickly discern trends and correlations in data when the data is presented in spreadsheet format. Consequently, trends might be present in the data, and/or important correlations might exist between variables of the data, but the trends and/or correlations might escape discovery when the data is presented in tabular form.

The present invention recognizes that when data is to be presented to users and to business audiences both for analyzing the data and for advocating a particular business position, graphical presentation of data can better convey particular business trends and forecasts than can simple tabular displays.

Data tuples may be supplied to computer users in many formats, including, among others, real-time data feeds, databases (relational or otherwise), flat files, and spreadsheets. The present invention further recognizes that data spreadsheet applications for non-expert computer users have greatly proliferated, and that graphics applications that are intended to enable such users to better exploit their databases preferably should be relatively simple, indeed, intuitive, to use, so that such users might be able to quickly and easily discern correlations and trends as well as generate interesting graphics for business presentations.

Unfortunately, existing personal computer (PC)-based data graphics applications merely provide static, two-dimensional graphics charts. To the extent that three spatial dimensions are presented by existing PC-based graphics applications, the third dimension typically has no data significance. Consequently, such applications do not enable the non-expert user to easily depict the potential correlations between three or more variables. Further, owing to the generally static nature of displays that are generated by existing PC-based graphics applications, time-dependent behavior of data is not displayed as effectively as it might be.

As still further recognized herein, hardware, in the form of computer chips to support 3D graphics, has been developed for the computer game industry, and such hardware is increasingly being incorporated into PCs for game purposes. The present invention propitiously recognizes that such 3D hardware can be used by non-game applications, e.g., by a business-oriented application or process-oriented application or science-oriented application, to provide a system for generating dynamic 3D graphics that can present three or more database variables at once that can move or vary over time, to enable non-game users to thereby easily discern data trends and/or correlations as well as to generate effective data presentations.

In addition, the present invention recognizes that some users of such a system, particularly relatively novice computer users, might desire a graphics generating program that automatically undertakes at least some tasks involved with correlating database elements to graphics or visual attributes of a 3D graphical display. With this in mind, the present invention recognizes the desirability of providing a rule-based system that automatically identifies particular data attributes/characteristics and based on these, generates a model 3D display for the user using the system rules.

Accordingly, it is an object of the present invention to provide a PC-based 3D graphics system which graphically presents three or more database variables at once. Another object of the present invention is to provide a PC-based 3D graphics application which has an open architecture such that user developers of the application can alter the application to fit their needs. Still another object of the present invention is to provide a PC-based 3D graphics application in which correlations between three or more database variables can be graphically presented. Yet another object of the present invention is to provide a PC-based 3D graphics application that is easy to use and cost effective. Another object of the present invention is to provide a PC-based 3D graphics application that presents a dynamic graphics display which uses time-dependent variance to enliven the display and to present the values of a database variable using the dimension of time. Still another object of the present invention is to provide a PC-based 3D graphics application in which correlations of database variables to graphics attributes can be automatically made for a user.

SUMMARY OF THE INVENTION

A computer program product having a computer readable medium is used to direct a digital processing apparatus to perform the inventive method steps disclosed herein. In other words, the program product is readable by the digital processing apparatus, and the program product tangibly embodies a program of instructions executable by the digital processing apparatus to perform the inventive steps disclosed below. Indeed, a digital processing apparatus itself is disclosed herein whose actions are directed by the computer program product to perform specific operational steps set forth by the computer program product. As intended by the present invention, the program product is realized in a critical machine component that causes the digital processing apparatus to perform method steps for generating, for presentation on one or more displays, graphics representative of elements in a database, with each element being characterized by one or more variables.

The program product instructs a computing device to present, on the display, a variable list of at least some of the variables. Also, the program on the program product includes presenting, on the display or displays, a graphical list of at least some graphics attributes of at least one graphics object. Moreover, the program includes permitting a user to correlate at least some of the variables to respective graphics attributes, and presenting on the display the graphics object or objects, based on the correlation of variables to graphics attributes. The graphics object or objects may be displayed with the lists.

In a preferred embodiment, the permitting step includes permitting a user to correlate any variable or collection of variables with one or more graphics attributes, one of which attributes is display variance. Other graphics attributes include position or extent in spatial dimension, graphics object rotation, graphics object color, graphics object size, graphics object visual texture, graphics object visual finish, graphics object opacity, and, in a broader sense, scent and tactility.

Importantly, the program immediately depicts on the display or displays the effect on the graphics objects of the correlations of database variables to graphics object attributes. Thus, the present program permits direct manipulation of the actual graphics display by, in one embodiment, clicking and dragging a database variable from the variable list onto a graphics attribute in the graphical list.

The program also includes presenting a legend of variables together with the graphical list in automatic response to the correlation of variables to attributes, as part of the direct manipulation feature of the present invention. Preferably, an object list of at least some of the objects is presented in a juxtaposed relationship with the graphical list. Thus, the lists and graphics objects are presented on the display simultaneously with each other.

In another aspect, a computer program product having a computer usable medium includes logic means for receiving data from a database having data elements, with each data element being characterized by one or more values of one or more variables. Also, logic means are provided for presenting graphics objects on a visual display associated with a computer. As discussed in detail below, each graphics object represents a respective one of the data elements, and each graphics object is characterized by one or more graphics attributes. Furthermore, logic means correlate graphics attributes of at least one of the graphics objects to variables of at least one data element using a click and drag operation.

In still another aspect, a graphics system characterized by an open architecture includes a data visualization system.

The data visualization system in turn includes at least one initial visualization model characterized by predefined visual attributes. A visualization model control module is provided which includes logic means for permitting a user to define, using a preexisting display model, a graphics scene characterized by visual attributes. Also, a visualization model interface permits a user to correlate database variables to model attributes. Moreover, a user developer can define new display or visualization models, such that a subsequent user of the data visualization system can use the initial visualization model or the new visualization model.

Preferably, the data visualization system includes a visualization scene builder for generating 3D objects and their behavior over time in response to the visualization model control module. Moreover, in the preferred embodiment the data visualization system includes a data parser for receiving input data from ODBC data sources and real time data feeds from, e.g., the Internet, and outputting values of database variables based thereon, and a rendering engine that transforms a 3D scene to 2D format, such as an "AVI" format or a "BMP" format.

In another aspect, a presentation viewer for presenting on one or more displays, graphics representative of elements in a database, each element being characterized by one or more variables includes a computer program product having computer readable code thereon to enable a computing device to undertake the steps of accessing one or more files. The accessed files are files that have been previously generated by correlating variables on a variable list of at least some of the variables with graphics objects on a graphical list of at least some graphics attributes of at least one graphics object. Then, based on the files, the graphics object or objects are presented on the display or displays.

In another embodiment, a computer-based system is disclosed for generating graphics representative of variables in a database for presentation of the graphics on one or more displays capable of presenting one or more graphics objects having one or more graphics attributes. The system includes a computer program product having computer readable code to enable a computing device to undertake the inventive steps disclosed below. These steps include receiving one or more user-generated inputs representative of respective one or more variables, and accessing a set of electronically stored correlation rules. Also, the present computer steps include, based on the accessing and receiving steps, automatically correlating at least some of the variables to respective graphics attributes. The graphics object or objects are then presented on the display, based on automatically correlating step.

Preferably, the automatically correlating step automatically correlates variables with respective graphics attributes based on at least one electronically stored correlation rule. At least some correlation rules are associated with at least some correlation conditions having condition elements, and at least some of the inputs received in the receiving step can represent one or more condition elements. In one preferred embodiment, the correlation condition elements include one or more of: (a) whether the user permits animation; whether a time-related variable is to be presented; (c) the number of variables to be presented; (d) whether one or more variables to be graphed refers to a set of data; (e) whether plural data sets for a first variable are to be presented; (f) whether a distinct variable exists in that the distinct variable cannot be depicted on the same scale as at least a non-distinct variable; and (g) a limit on the number of spatial dimensions to be presented. Desirably, the computer program can automatically determines whether one or more of the variables is time dependent.

In another aspect of the alternate embodiment, a graphics system for presenting graphics objects on a visual display associated with a computer includes a user input receiver for receiving user inputs representative of at least one of: database elements; and database variables associated with database elements. The system further includes a rule interpreter for correlating at least one graphics attribute of at least one of the graphics objects to at least one database variable by accessing a set of correlation rules.

In yet another aspect of this last-mentioned embodiment, a computer-based system is disclosed for generating graphics representative of variables in a database for presentation of the graphics on one or more displays capable of presenting one or more graphics attributes of one or more graphics objects. As disclosed in detail below, the system includes a set of user-specified variables, a set of conditions, and a set of rules. Each rule has an associated graphics presentation action. A rule interpreter selects at least one rule from the set of rules based on the set of user specified variables and the set of conditions.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
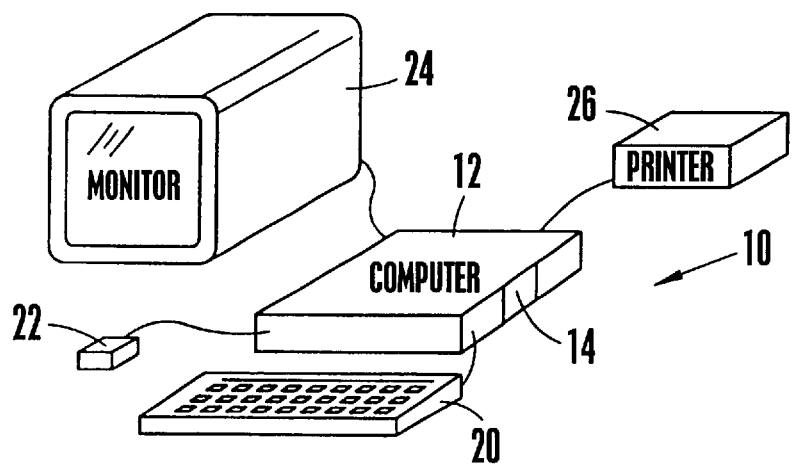
FIG. 1 is a perspective view of a digital processing system of the present invention.

Referring initially to FIG. 1, a system is shown, generally designated 10, for generating dynamic, animated graphics displays based on business-related data spreadsheets. More particularly, the system 10 generates graphics displays having up to three spatial dimensions. Within the display, graphics objects are shown which have values for various graphics attributes, including position and extent over each of the spatial dimensions, and also including variance over time, i.e., animation. Each graphics attribute can represent one or more respective variables in a database. Accordingly, the system 10 presents 3D graphics displays that depict data variables in an easy to use and easy to understand format.

As shown in FIG. 1, the system 10 includes a digital data processing computer 12 and an associated program storage device 14. In the presently preferred embodiment, the computer 12 is an IBM-compatible personal computer or laptop computer, although other types of computers, e.g., a computer made by Apple Computer or a type HP 9000/755 computer made by Hewlett-Packard and running the Unix-based operating system known as HP-UX 9.05, may be used.

Figure 2:
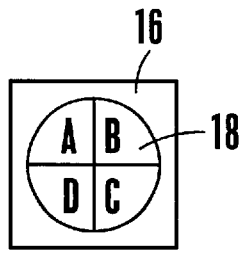
FIG. 2 is a schematic diagram of the computer program product of the present invention.

In accordance with the present invention, the program storage device 14 may be implemented by one or more processors within the computer 12 that execute a series of computer-executable instructions. These instructions may physically reside, for example, in electronic random access memory (RAM) and/or electronic read-only memory (ROM) of the computer 12. Alternatively, the instructions may physically be contained on a data storage medium, such as a computer diskette 16 shown in FIG. 2. The machine component is shown in FIG. 2 as a combination of program code elements A–D in computer readable form that are embodied in a computer-usable data medium 18, on the computer diskette 16. Or, such media can also be found in semiconductor devices, on magnetic tape, on optical disks, on a DASD array, on magnetic tape, on a conventional hard disk drive, or other appropriate data storage device.

Thus, the flow charts and block diagrams disclosed herein illustrate the structure of the 3D graphics display application program of the present invention as embodied in computer program software. Those skilled in the art will appreciate that the Figures illustrate the structures of computer program code elements that function according to this invention. Manifestly, the invention is practiced in one essential embodiment by a machine component that renders the computer program code elements in a form that instructs a digital processing apparatus (that is, a computer) to perform a sequence of operational steps corresponding to those shown in the Figures. In an illustrative embodiment of the invention, the computer-executable instructions may be lines of compiled C++ language code, or compiled lines of any other appropriate language code such as assembly code, or incorporate other object code necessary for the application, e.g., object code used by APIs such as DirectX (TM) or Open GL (TM).

In any case, whether embodied by software on a diskette or other medium or embodied by logic circuits resident on a semiconductor chip that is accessible to a microprocessor, the present computer usable medium includes logic means for undertaking the inventive steps disclosed herein. As yet another alternative, the present invention can be implemented by a circuit board (not shown).

FIG. 1 shows that the system 10 can include one or more data input devices, such as a keyboard 20 and mouse 22. Other well-known input device configurations can be used, e.g., a keypad, trackball, or voice-recognition device. Or, a 3D input device can be used. Also, the system 10 includes one or more output devices, such as a video monitor 24 and a laser printer 26. It is to be understood that the system 10 can incorporate other output devices well-known in the art, e.g., graphics printers.

Figure 3:
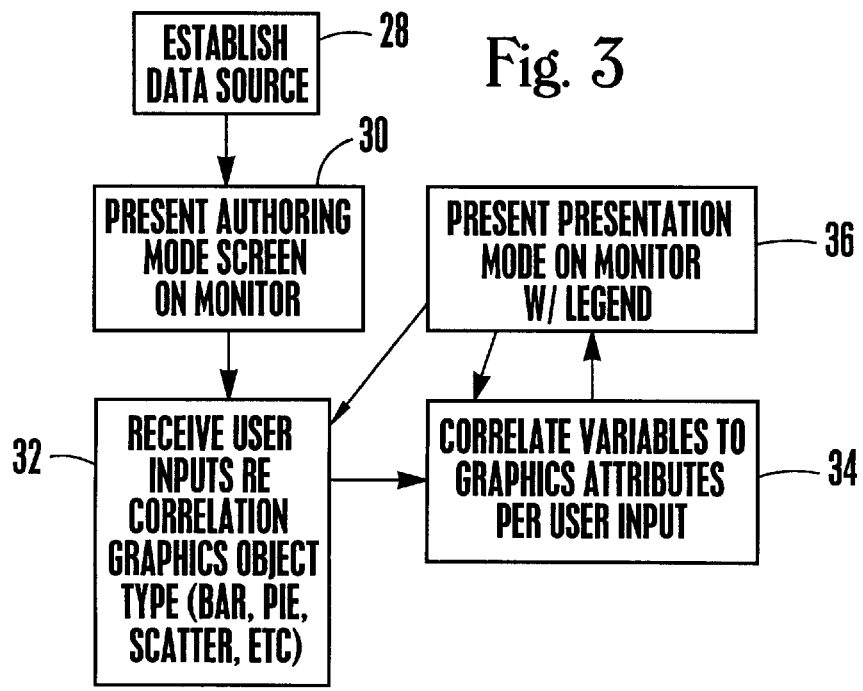
FIG. 3 is a flow chart showing the overall graphics generation steps of the present invention.

Now referring to FIG. 3, the overall graphics generation steps can be seen. The results of these steps are shown in the screen displays represented by FIGS. 4 and 5, and further details of the steps shown in FIG. 3 are discussed in relation to FIGS. 6–9 below. While for illustration purposes the computerized steps are shown in flow chart format, it is to be understood that because of the return loop to the correlation steps, the user's experience might be that the steps are undertaken in almost arbitrary order.

At block 28, a data source is established, either by the user or automatically by hard code. For example, in the presently preferred embodiment the system 10 receives input data for graphical display thereof from a Microsoft Excel™ spreadsheet, and more particularly from a data output file of Excel™ in either "CSV" or "XLS" formats. Alternatively, the input data can be sourced from a real time data feed from, e.g., the Internet. The data source can be accessible via the ODBC standard.

Figure 4:
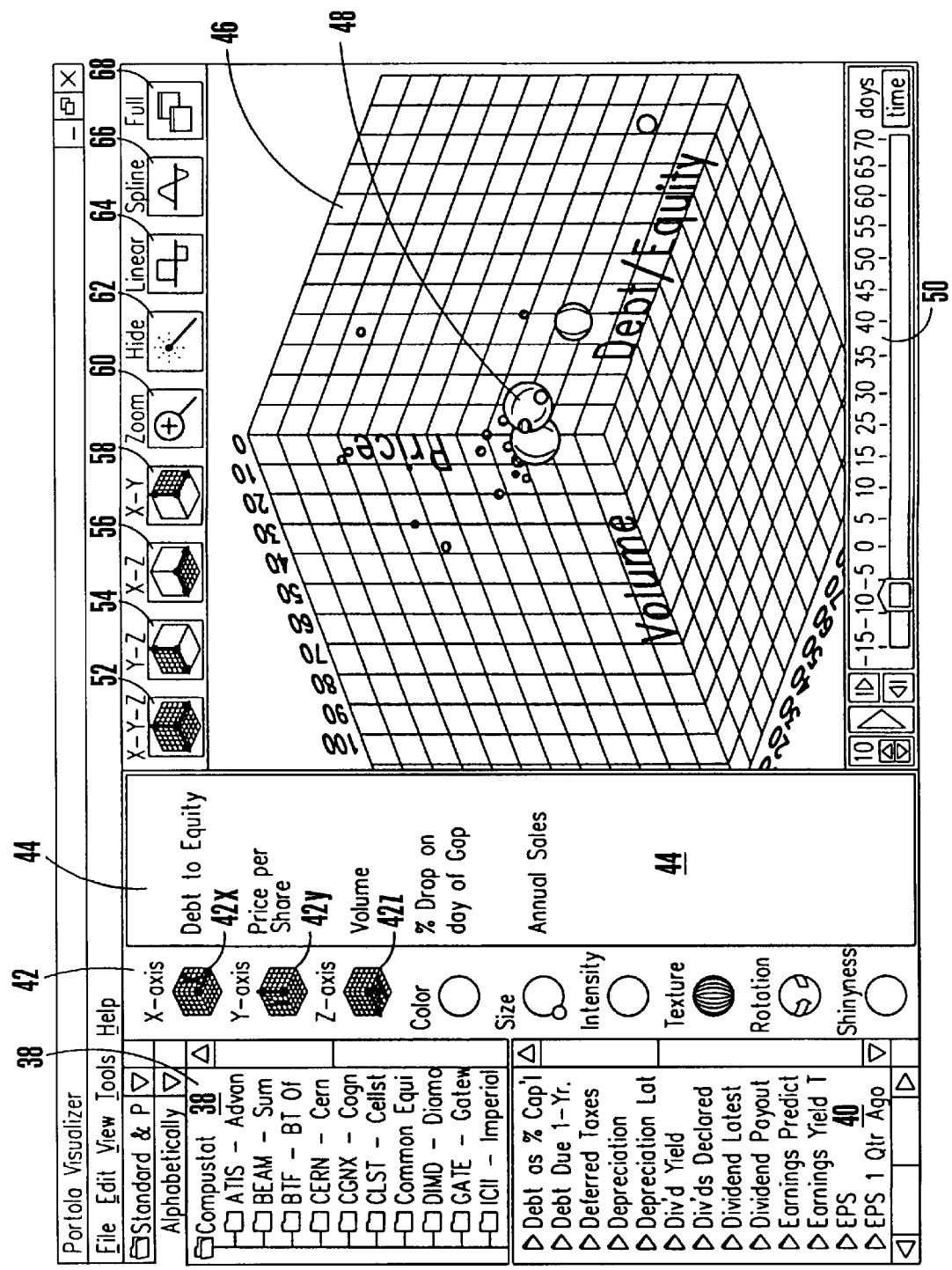
FIG. 4 is a view of the authoring mode screen.

Next, at block 30 the authoring mode screen shown in FIG. 4 is presented on the monitor 24 (FIG. 1). Moving to block 32, the system 10 receives user inputs regarding what database variables the user wishes to correlate to what graphics attributes. Additionally, the system 10 receives user input regarding what type of graphics object is to be displayed, e.g., bars for each database element for presentation in bar chart format, or pie segments for a pie chart format, or spheres for a scatter plot format, or other graphics object type that might be defined by a user. In response to the user inputs, at block 34 the system 10 correlates the variables to graphics attributes. Simultaneously with the correlation of variables to graphics attributes, at block 36 the system 10 presents a graphical representation of the database data in either the authoring mode shown in FIG. 4 or the presentation mode shown in FIG. 5, along with a graph legend. Aspects of this direct manipulation are represented in FIG. 3 by flow arrows from block 36 to blocks 32 and 34.

Figure 5:
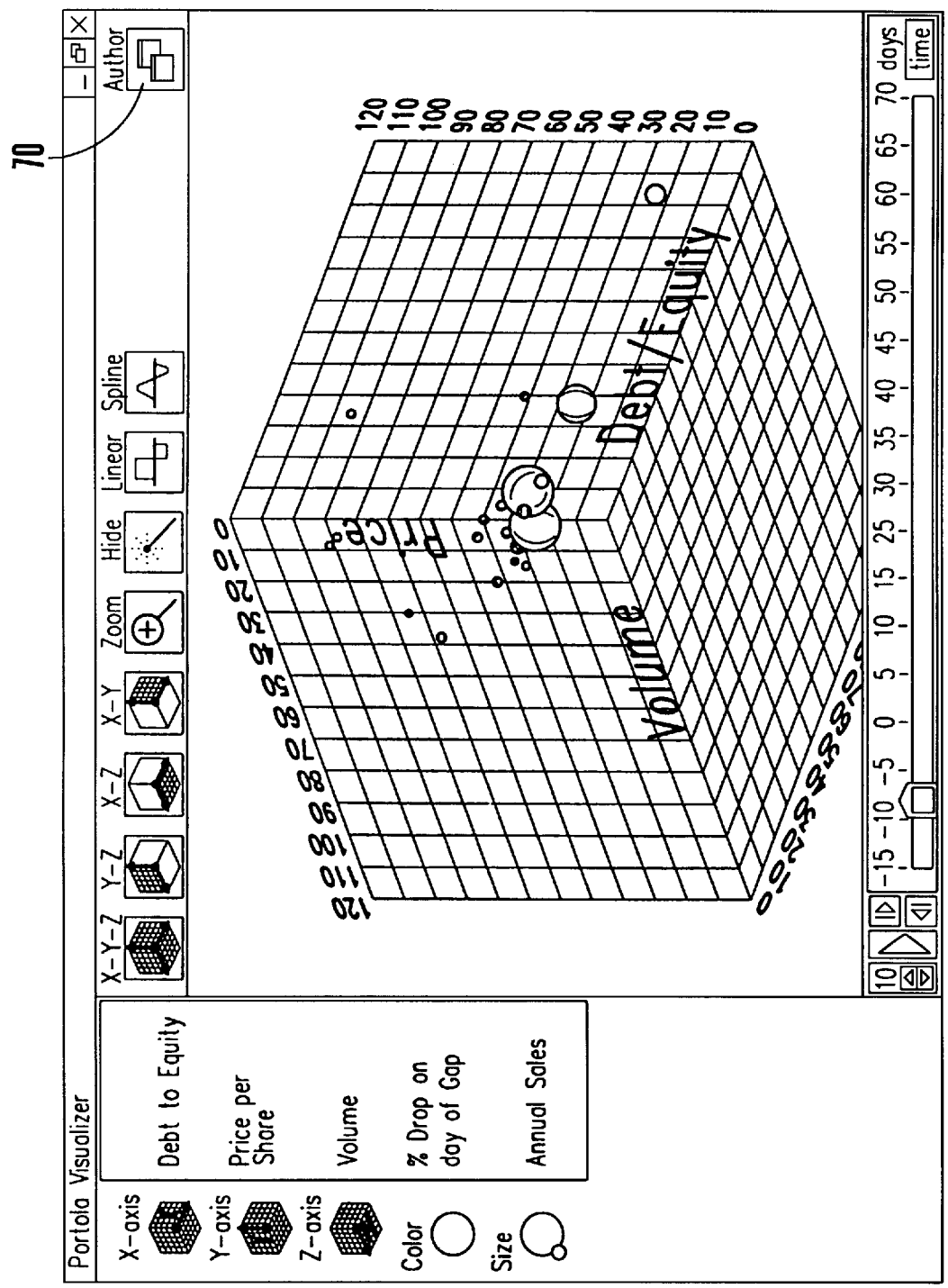
FIG. 5 is a view of the presentation mode screen.

The above overall steps can be better appreciated in reference to FIGS. 4 and 5. Starting with the authoring mode screen shown in FIG. 4, a list 38 of database elements received from the database at step 28 in FIG. 3 is presented. In the example shown, the elements on the list 38 are publicly traded stocks, with each element representing, e.g., a respective row or indeed a respective page in the spreadsheet.

Also, a list 40 of database variables is presented with the elements list 38. As can be appreciated in reference to FIG. 4, the variables on the variables list 40 are variables that are related to the elements on the elements list 38. In other words, the variables are elements associated with the nth position in a set of database tuples, i.e., elements on the elements list 38. The variables on the variables list 40 can represent, e.g., columns of the spreadsheet, with the variables being input into the spreadsheet manually or from a data source, or with certain variables being determined mathematically by the spreadsheet application from other spreadsheet variables in accordance with spreadsheet means known in the art. Such mathematically determined variables are dependent upon the independent variables from which they are determined. For example, two independent variables might be a price of a stock and the earnings of the stock, with a ratio of the two (i.e., price/earnings) being determined as a dependent variable by the spreadsheet application.

FIG. 4 also shows that juxtaposed with the lists 38, 40 is a graphics attribute list 42. As shown, the graphics attribute list 42 graphically depicts attributes of the graphics display to be generated, including positions on the three spatial dimensions 42x, 42y, 42z that correspond to the three axes in Cartesian coordinates. Also, as shown the graphics attributes can include attributes of the objects to be displayed, e.g., color, size, intensity, texture, rotation, shinyness, etc. Further, the graphics attribute list 42 lists time as an attribute. Indeed, non-visual attributes might be listed, e.g., scent of objects in a scent-generating system, or tactility of objects in a tactile system.

With the above disclosure in mind, the preferred means by which a non-expert user can easily and intuitively associate a database variable with one or more visual attributes can be appreciated. The user manipulates the mouse 22 to position the display cursor over a variable on the variable list 40. Then, the user depresses the mouse button to lock the variable onto the cursor, and next the user moves the mouse as appropriate to drag the variable over a desired graphics attribute on the list 42. The user then releases the mouse button, indicating that the variable is to be correlated with the graphics attribute. Thus, the user can easily correlate any variable with any graphics attribute using a click and drag operation.

The correlation of a variable with an attribute is automatically indicated, as soon as the correlation is made, by a legend 44 that appears next to the graphics attribute list 42. In the example shown in FIG. 4, a variable "debt to equity" has been correlated to the x-axis, and a variable "price-per-share" has been correlated to the y-axis. On the other hand, a variable "volume" has been correlated to the z-axis. Additionally, a variable "% drop on day of gap" has been correlated to the graphics attribute of object color, whereas a variable "annual sales" has been correlated to the graphics attribute of object size.

In response to and simultaneously with the above correlations, in addition to presenting the legend 44, the system 10 presents a graph 46 with up to three spatial dimensions (3D) and having, in one preferred embodiment, Cartesian coordinates. In other words, the non-expert user does not have to overlay the present graph 46 or legend 44 with a dialog box to undertake the correlations or indeed to change grid lines, font, etc., and then return to a graph to view the results of the manipulations in the dialog box, in contrast to many existing systems. Instead, the graph 46, legend 44, and necessary dialog elements (i.e., the lists 38, 40, 42 and the below-described graphics control elements such as buttons and toolbars) are presented simultaneously with each, with the legend 44 and graph 46 changing in response to and simultaneously with user inputs.

Although 3D is preferred for the graph 46, it is to be understood that if the user desires to display the values for only one or two variables, the present system can render a two-dimensional graphics display. The graph shown in FIG. 4 presents graphics objects 48 in the form of scatter plot spheres, although it is to be understood that, as mentioned above, other 3D formats can be presented, e.g., bar graphs or pie charts. As shown, the graphics objects 48 on the graph 46 are displayed with the lists 38, 40, 42 and the legend 44.

The positions of the graphics objects 48 in the Cartesian system shown are defined by the variables correlated to the respective axes. Accordingly, in the example shown, the x, y, and z coordinates of each object (representing a database element on the elements list 38) is respectively determined by that object's debt to equity, price per share, and volume. Also, the color of each graphics object 48 is determined by the corresponding database element's % drop on day of gap, while the size of each graphics object 48 is determined by the annual sales of the corresponding database element. If desired, additional database variables on the variables list 40 can be correlated to additional graphics attributes, e.g., intensity, texture, rotation, shinyness.

Moreover, the graph shown in FIG. 4 can be animated, i.e., the graphics attributes of the graphics objects 48 can be caused to vary over time, by correlating a database variable to the graphics attribute of time. The present invention can thus create animation that can be written to "AVI"-formatted files. To create the animation, key frames can be set along the animatable axis at predetermined time intervals with the system 10 interpolating between the corresponding camera positions to move the graphical presentation from one key frame to the next. Alternatively to time, the animatable axis can be any linear progression such as temperature, conductivity, or other property.

As discussed further below, correlation of a database variable with an attribute such as variance over time can be done by the user using the click and drag procedure described above, or automatically by the system 10. For example, if each database element represents a page of a spreadsheet of stock data, with the columns representing the variables and the rows representing daily values for the variables, the time attribute can be correlated with the row elements corresponding to stock price, so that the graphics objects 48 move over time in accordance to the stock price fluctuation of the underlying database element.

If desired, the authoring mode screen shown in FIG. 4 can include various graphics control elements such as buttons and toolbars that are operated by means known in the art, e.g., by clicking the mouse 22 on the elements or by touching the elements if a touch screen display is used. For example, a time window control element 50 can be operated by appropriately manipulating the mouse 22 to establish the time window over which animation is desired on the graph 46. Also, dimension control elements 52, 54, 56, 58 can be used to respectively present the 3D graph 46 shown in FIG. 4, or to present a 2D depiction of the data by displaying an orthographic projection of the graph such that the x, or y, or z dimension is viewed from the side and, hence, is suppressed.

Furthermore, a zoom button 60 can be operated to cause a portion of the one or more of the lists 38, 40, 42, legend 44, or the graph 46 to be enlarged, and a hide button 62 can be operated to remove an object or graph portion from view. Linear and spline buttons 64, 66 can be used to select the method for interpolating between values of data variables that might be depicted on the graph 46, and a full button 68 can be operated to invoke the presentation screen shown in FIG. 5. If desired, a graphics mode button (not shown) can be provided to enable the user to signal to the system 10 a desire to convert, e.g., a scatter plot as shown into a bar chart, in which the graphics attributes on the graphics attribute list 42 would correspond to attributes of the graphics objects (e.g., rectangular bars) of the new graphics mode.

Moreover, the user can click on a graphics object 48 and move the object 48. In accordance with present principles, when a graphics object 48 is moved or otherwise has one of its attributes changed, the system 10 simultaneously causes the underlying variable value in the database to be changed appropriately. Thus, the user can change the database by manipulating the graphics objects 48.

FIG. 5 shows the presentation screen that the user can invoke, once the variable-to-attribute correlations discussed above have been defined. The presentation screen shown in FIG. 5 is in all essential respects identical to the authoring screen shown in FIG. 4, with the exception that the elements list 38 and variables list 40 have been removed. The user can return to the authoring screen by operating an author button 70. If desired, just that portion of the system that presents the screen shown in FIG. 5 can be provided to a user who does not possess the entire system 10 for enabling such as user to view, but not edit, the graph 46. This presentation portion of the system 10 can be configured as a separate application to accept as input the relevant variable values and animation controls, so that it can be operated independently of the original data source.

The details of the correlating steps described above can be appreciated in reference to FIG. 6. At block 72, the system 10 receives data from a database such as an Excel™ spreadsheet or other data source, and at block 74 the elements list 38 (FIG. 4) is presented. Next, at block 76 the variables list 40 is presented with the elements list.

In presenting the variables list 40, as indicated at block 76 the variables to be presented can be preset or they can be selected by the user. For example, the system 10 can infer the variables by determining the column or row headings, as appropriate, of a spreadsheet as the variables on the list 40. Or, the user can select variables from the data source to be listed.

Alternatively, the system 10 can infer variables for presentation. For example, as indicated above variables can be presented as independent or dependent variables, depending upon whether the data source mathematically determines certain variables (i.e., dependent variables) as functions of other variables, or whether the values of the variables are constant, i.e., are independent variables. If the system 10 determines that the data source so determines variables, the dependent variables can be listed as superordinates to the independent variables from which the dependent variables are derived.

The above consideration is addressed at decision diamond 78, wherein it is determined whether the user has indicated that variables are to be presented in hierarchical form. If so, the process moves to block 80 to organize the variables on the list 40 hierarchically, with the hierarchy being defined by the user or being inferred, e.g., from data source algorithms, as described above. At block 81 the data can be written to a .pds file described further below.

From block 80, or from decision diamond 78 if the decision there was negative, the process moves to block 81A to permit the user to select a visualization model or, if one has already been selected, to change to another model. Thus, at block 81A the user can select to use a bar chart model, pie chart model, scatter plot model, or other model supported by the system 10 for presentation.

From block 81A the process moves to block 82, in which the graphics attribute list 42 (FIG. 4) is presented graphically and alpha-numerically as shown in FIG. 4. Next, at block 84 the user click and drag commands are received to correlate the database variables on the variables list 40 with the graphics attributes on the list 42.

Proceeding to decision diamond 86, it is determined whether automatic time correlation has been selected. More specifically, at decision diamond 86 it is determined whether the user wishes to correlate a variable with the graphics attribute of variance of an attribute (e.g., graphics object position, size, color, etc.) over time, or whether such correlation is to be undertaken automatically. If the correlation of the time attribute is to be undertaken automatically, the system proceeds to block 88 to correlate the time attribute to a database variable whose value constitutes a sequence by, e.g., inferring that a first data page represents elements and their variables at a first time, the next subsequent data page represents the elements and variables at a second, subsequent time, and so on, and that the time dependency of one or more of the variables is to be shown in animation. Or, the variable that is determined to most strongly reflect time can be correlated to the time attribute.

From block 88, or from decision diamond 86 if the test there is negative, the system 10 proceeds to block 90 to normalize the objects 48 on the graphics plot 46 (FIG. 4). In normalizing the data, the system 10 can use conventional normalization techniques to normalize the data to the available range of each visual attribute. Or, the user can specify a normalization, or the data can be normalized to the value of a selected object's variable. As yet another alternative, after initial normalization, one or more graphics objects can be muted as mentioned above, and the data then re-normalized, to more effectively plot the remaining data elements.

Furthermore, at block 90 the display may be time shifted automatically or in accordance with a user-defined time shift. Stated differently, the graphics plot 46 can shift any visual attribute by selecting a particular value of the corresponding variable as a "zero point" for the scale of the attribute for each element in the database/spreadsheet. For example, using the stock analogy, it may be desirable to define the zero point for each one of a number of stocks not according to an absolute time standard, but according to when a particular event, e.g., a so-called "gap" day, occurred for each stock. It will be appreciated that under such circumstances, the database variables that have been correlated to the graphics attribute of time are displayed in the temporal dimension according to a reference which is related to the elements, and not to an absolute time reference.

Figure 6:
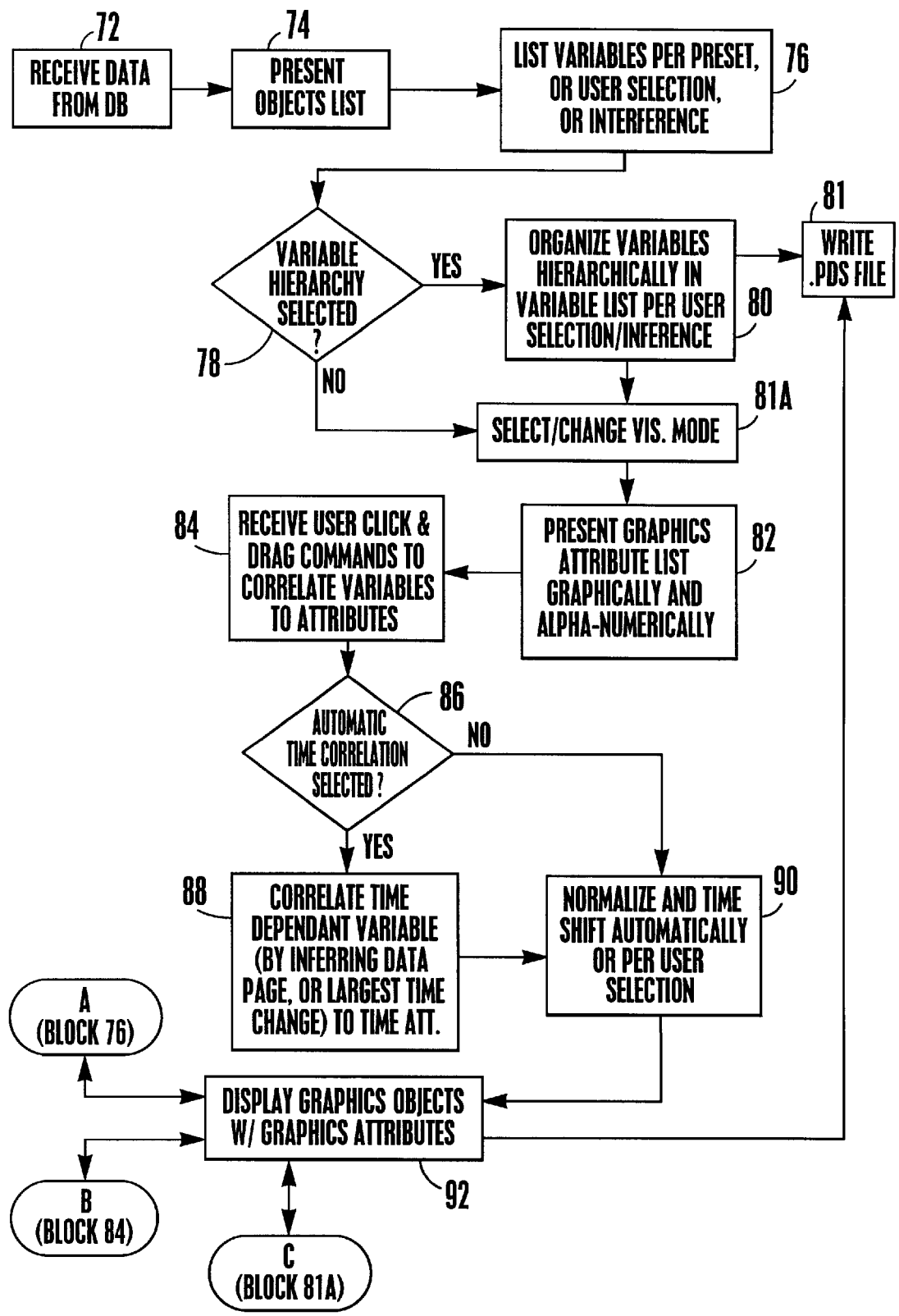
FIG. 6 is a flow chart showing the authoring steps.

At block 92, the graphics objects are displayed with the appropriate graphics attributes as described above. To represent the direct manipulation of the present invention, FIG. 6 shows double flow arrows from block 92 to and from states "A", "B", and "C", respectively representing blocks 76, 84, and 81A. In other words, FIG. 6 reiterates that as a user correlates a database variable to a graphics attribute by the above-described click and drag process, the graphical display and legend 44 are simultaneously updated as appropriate to reflect the correlation, and FIG. 6 further reiterates that the user may change on the fly from one visualization model (e.g., bar chart format) to another visualization model (e.g., pie chart format).

Figure 7:
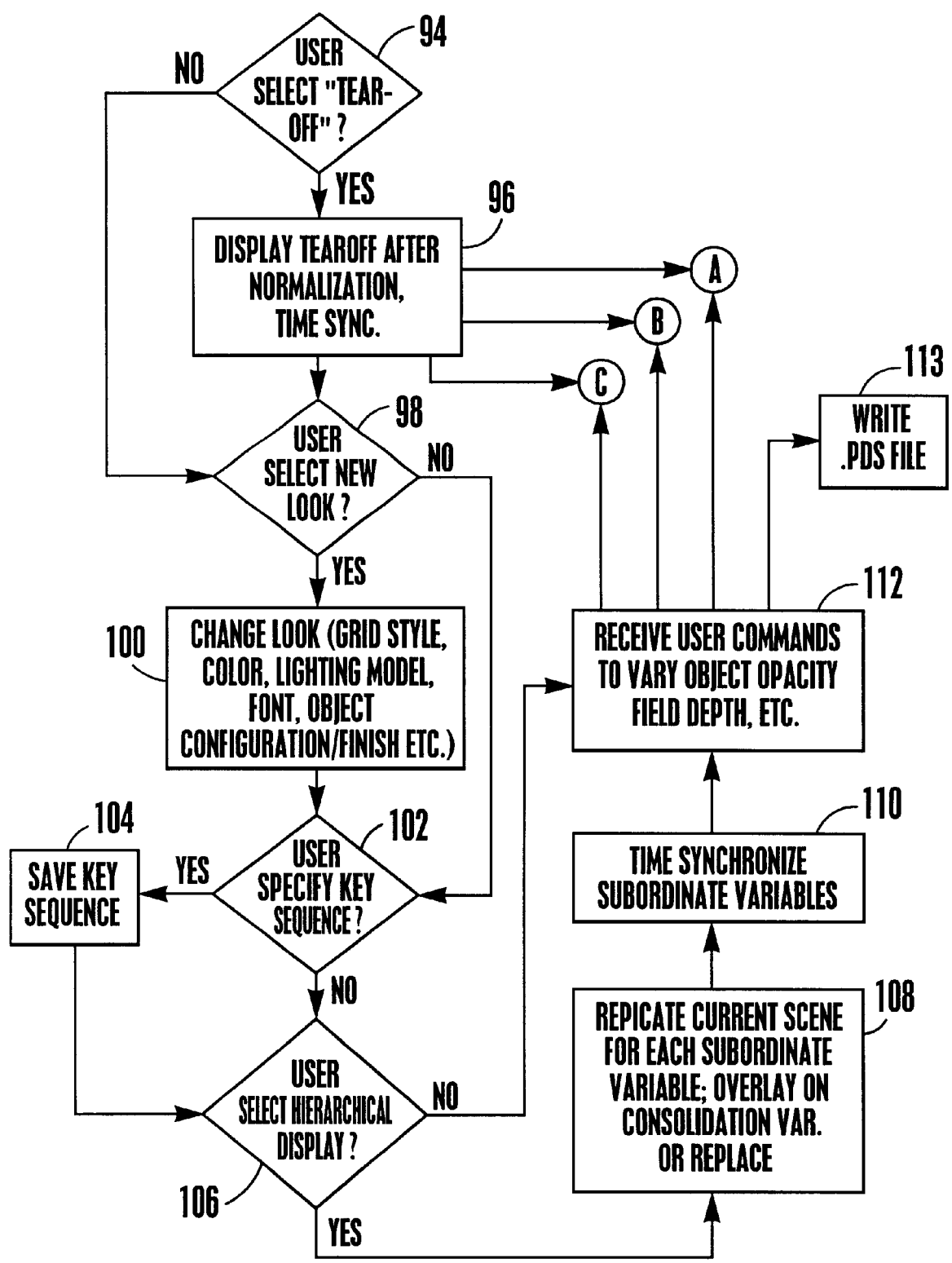
FIG. 7 is a flow chart showing optional presentation steps.

Now referring to FIG. 7, further details of the presentation mode can be seen. Commencing at decision diamond 94, it is determined whether the user has selected a "tear off" section of the spreadsheet for presentation by, e.g., selecting a portion of an Excel™ spreadsheet. If so, the process moves to block 96 to graphically display the "tear off" after variable to attribute correlation, normalization, and time synchronization as discussed above.

Proceeding to decision diamond 98, the system determines whether the user has selected a new look for the graphical representation. If so, the process moves to block 100 to change the look of the graph 46 (FIG. 4) by changing, as determined by the user, any one or more of the grid style, grid color, lighting model, font, object configuration (e.g., by displaying points in a scatter plot as fanciful objects instead of spheres), and object finish.

The next user interaction supported by the present system is shown starting at decision diamond 102, wherein it is determined whether the user has specified that the user desires to have a key time period of data or other key sequence of data saved for future display. If the user has designated a key sequence by appropriate manipulation of the mouse 22, the process moves to block 104 to save the sequence.

Continuing with the description of FIG. 7, at decision diamond 106 it is determined whether the user has selected a hierarchical graphical display of data, also referred to as a "drill down" presentation. As discussed above, the user can specify a hierarchical data organization, and if the user has indicated the desire to graphically display the data hierarchically by double clicking on the graphical representation of the consolidation (dependent) variable, the process moves to block 108 to replicate the current scene once for each subordinate variable. If desired, the subordinate variable graphical representations can be overlaid on the consolidation variable representation, or the subordinate variable representations can replace the consolidation variable representation. Then, the subordinate variables are time synchronized at block 110 using the time synchronization principles discussed previously.

Figure 8:
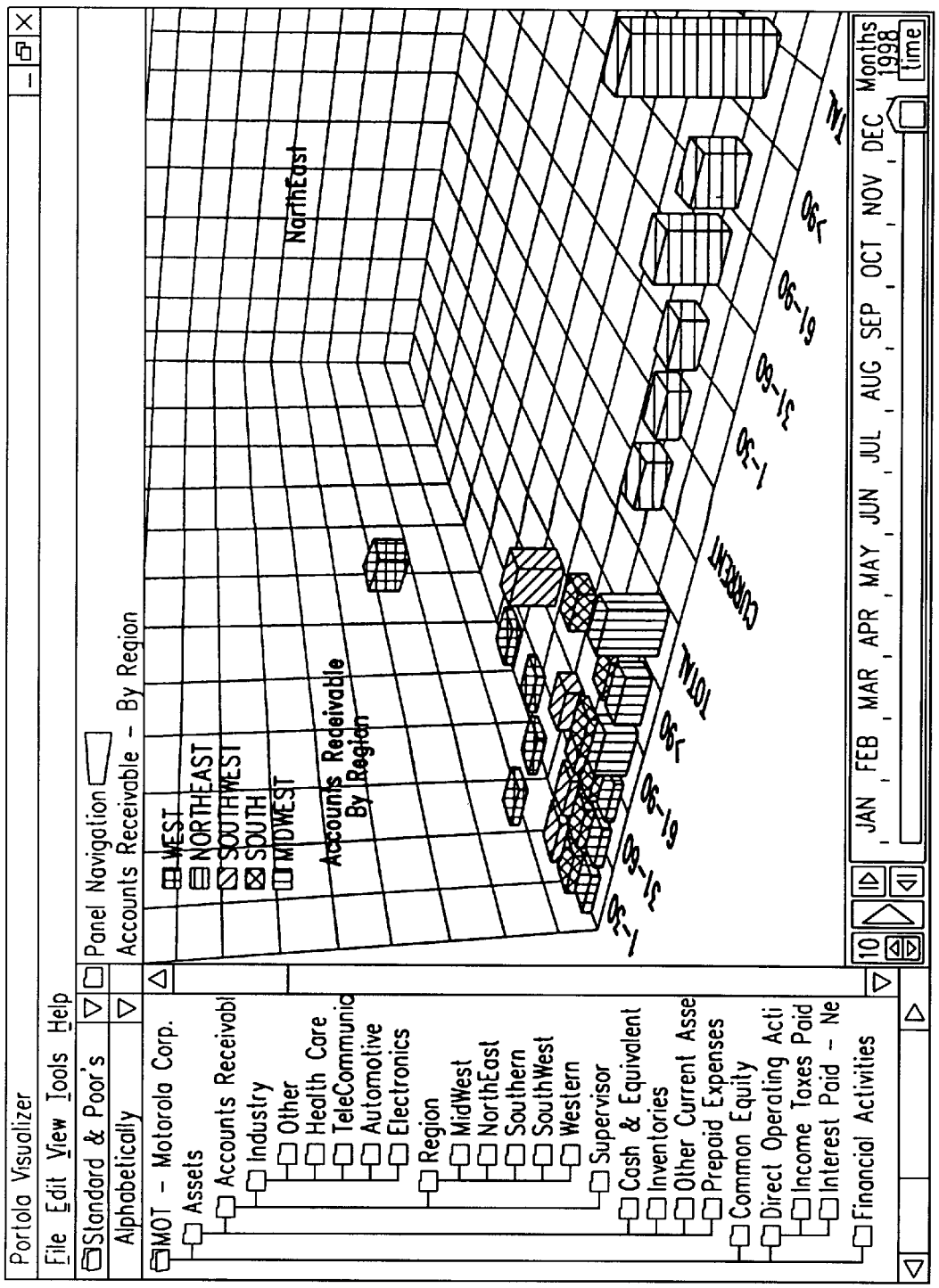
FIG. 8 is a view of a bar chart screen showing the drill down mode.

The results of the above process can be appreciated in the bar chart depicted in FIG. 8, which shows the database variables listed on the left side of the screen display and a bar chart on the right. The bar chart shows the accounts receivable consolidation variable broken down by region as indicated by the subordinate variable bar representations, which are color coded by region. Moreover, the user has highlighted the "northeast" subordinate variable on the variables list, causing the bars relating to northeast accounts receivable to be exploded away from the bars representing the other regions.

Next, at block 112 user commands are received to vary display characteristics, including graphics object 48 opacity, graphics object field depth, etc. Again using the stock analogy as an example, the user can specify that unprofitable companies are less opaque than profitable companies. To reflect the above-described direct manipulation feature, flow arrows extend from blocks 96 and 112 to states "A" and "B". If desired, the output of block 112 can be written to a .pds file, details of which are disclosed below, at block 113.

Figure 9:
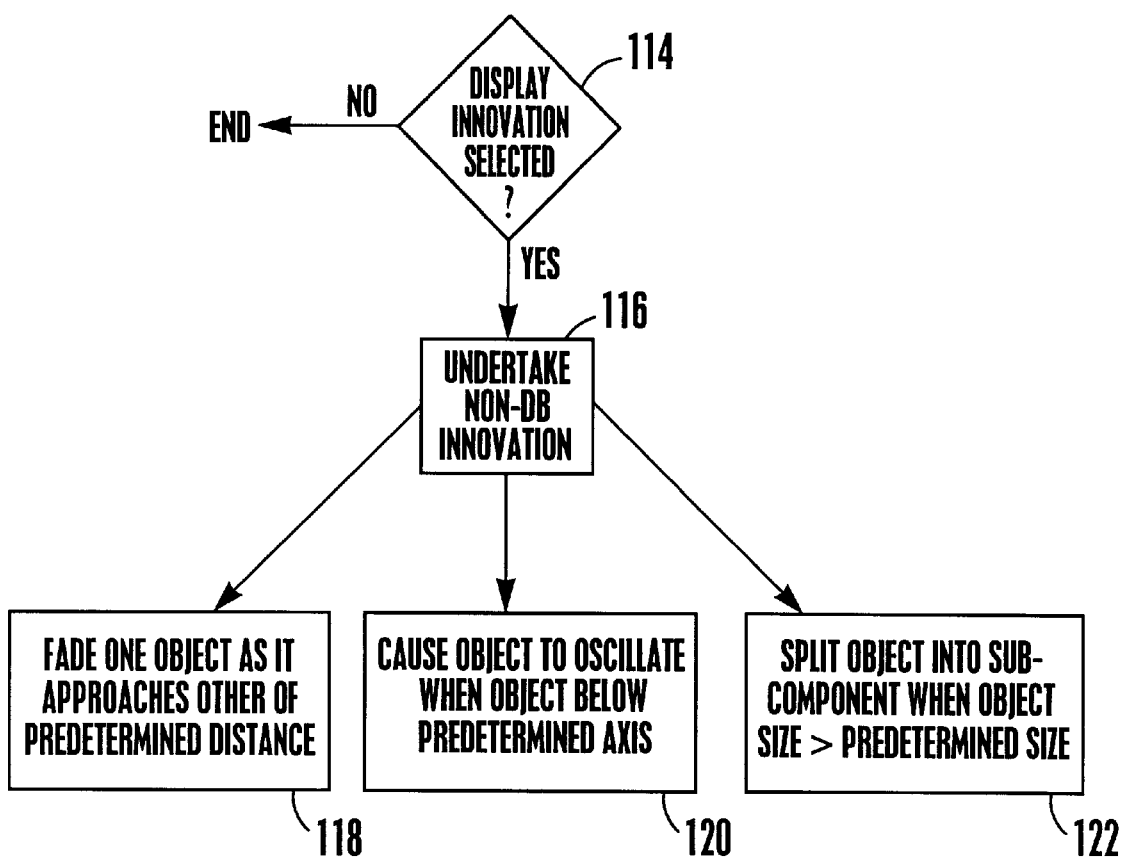
FIG. 9 is a flow chart showing optional display innovation steps for causing dynamic display behavior that is database independent.

Now referring to FIG. 9, various display innovations of the present invention are shown. These innovations are essentially trigger mechanisms that cause certain graphics behaviors based on a triggering event, preferred examples of which are discussed below.

At decision diamond 114 it is determined whether the user has selected any innovations, and if not, the process ends. Otherwise, the process moves to block 116 to undertake the novel user-defined, non-database dependent innovations shown in blocks 118–122. More specifically, the present display innovations result in animation that is not directly dependent on database input, but only indirectly dependent on the database. For example, at block 118 the user can specify that one object can fade out when it approaches another object to within a predetermined distance. Or, as indicated at block 120 the user can specify that an object oscillate when the object moves below, e.g., the x-axis. As another example of the present display innovations, at block 122 the user can specify that an object split into its subcomponents, if any, when the size of the object exceeds a predetermined size. Using the scatter chart stock context shown in FIGS. 4 and 5 as an example, if the sales of a stock (and, hence, the size of its corresponding graphics object 48) exceeds a certain point, the graphics object 48 can be split into three smaller spheres, with one sphere representing sales in North America, another representing sales in Europe, and the third representing sales in the Orient.

Still further, the present trigger mechanism could pause an animation or switch visualization models on the fly, in response to a triggering event in the underlying database or in the graphical display itself. The trigger mechanism could thus pinpoint an anomalous variable value by pausing the animation when the value is presented, to thereby highlight the value.

Figure 10:
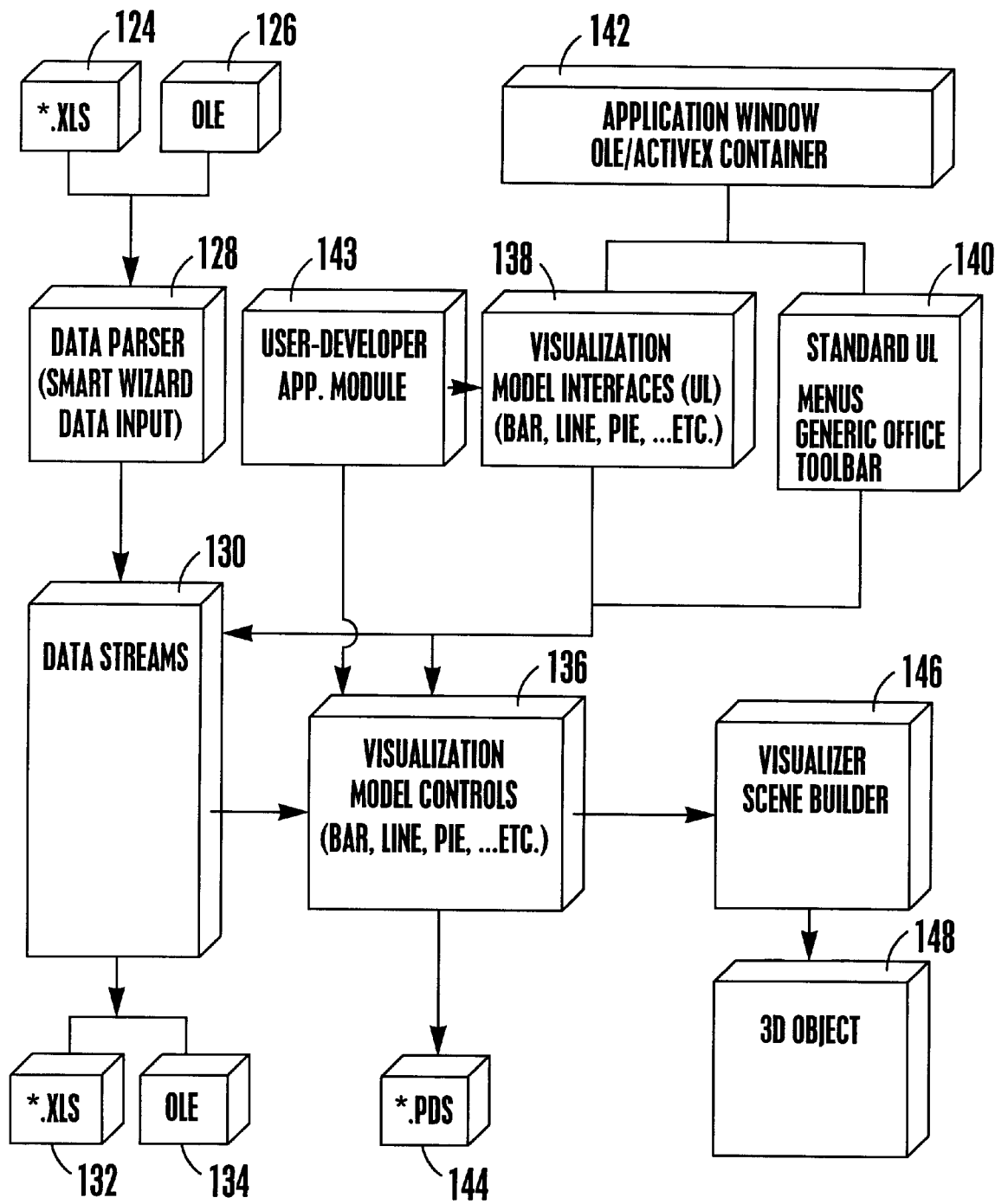
FIG. 10 is a block diagram of the architecture of the present software-implemented graphics generation system.
Figure 11:
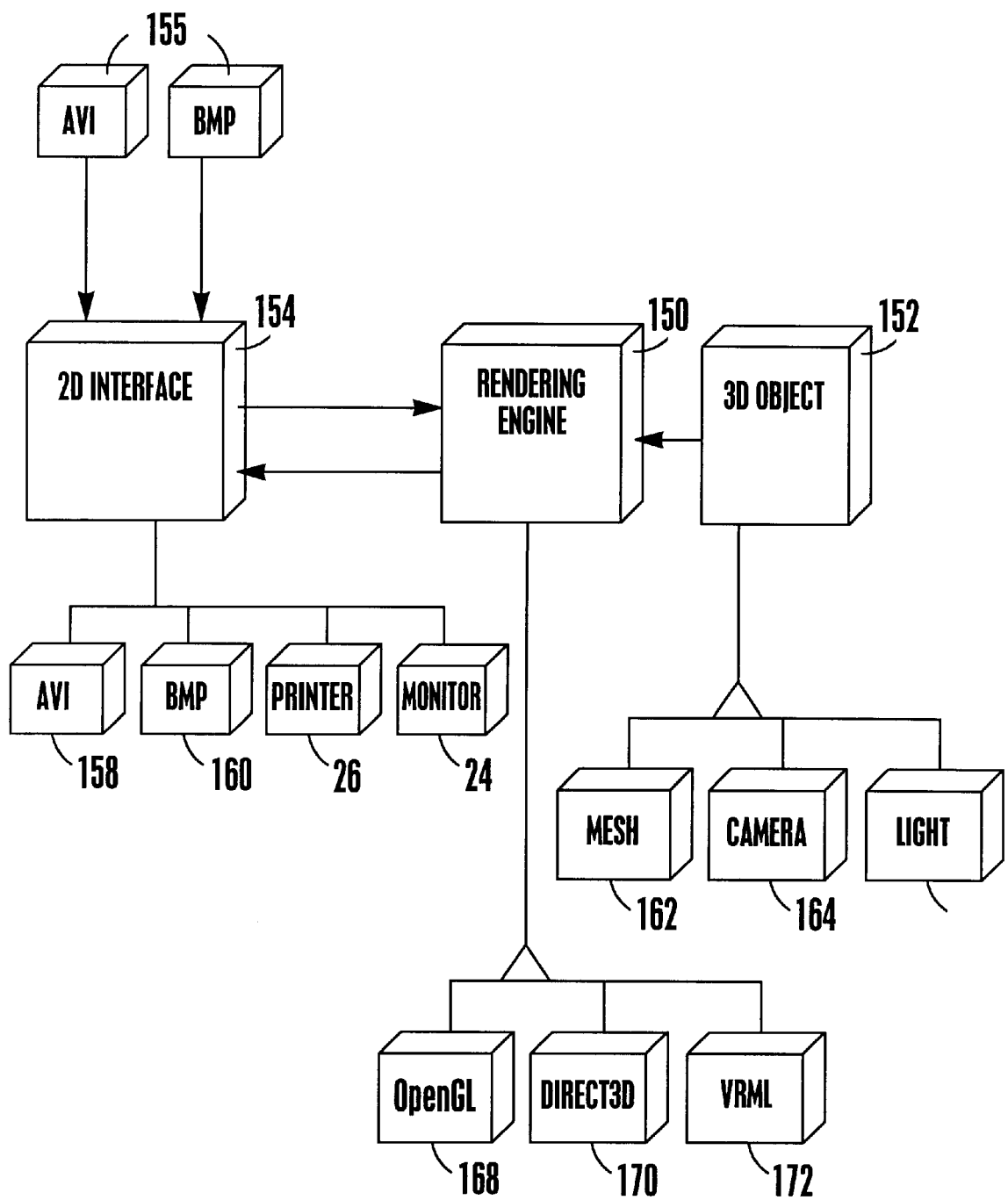
FIG. 11 is a block diagram showing 2D/3D data flow in the system.

FIGS. 10 and 11 illustrate the open architecture of the present system 10, which allows end users of the present visualization system to generate graphics scenes using existing display models (e.g., bar charts, pie charts, scatter plots) and which allows user-developers to add new display models to the system in accordance with their own preferences. In other words, a non-developer user can use the system described above in relation to FIGS. 1–9, the architecture of which is shown in FIGS. 10 and 11, to easily generate effective graphical presentation of data, whereas a user developer can use the open architecture shown in FIGS. 10 and 11 to further define display models that can be used by the system 10.

Data files 124, 126 from a data source are input to a data parser 128. More specifically, data in a spreadsheet file 124 (denoted ".xls" to indicate an Excel™ file) can be input into the system 10. Also, data from an appropriate data source using an appropriate object linking and embedding (OLE) interface to the source that is being executed on the computer 12 can be used as a data source. Among the applications that contain OLE interfaces are Excel™ and Access™. In the case of Excel™, a plug in button can be added to its toolbar to allow a user to directly import selected spreadsheet data into the system 10. Real time data input, e.g., from a scientific instrument, can also be used.

The input data is parsed by a data parser 128 into the database variables. In one preferred embodiment, the data parser 128 uses a Smart Wizard™ data input mechanism. The output of the parser 128 is in the form of data streams 130, which can be converted to output files 132, 134 respectively having spreadsheet formats and OLE formats, or other formats.

Additionally, the data streams 130 are sent to a visualization model control module 136. As shown in FIG. 10, the visualization model control module 136 also receives inputs from a visualization model interface 138 and a standard user interface 140, which are implemented as part of an application window 142. In one embodiment, the application window 142 can be an OLE/ActiveX™ container. In accordance with the present invention, the visualization model control module 136 includes logic for permitting an end user to define a scene using one or more of the visualization display models existing in the system 10 as described above, and to characterize the model by visual attributes using the visualization model interface 138.

If desired, the visualization model control module 136 can output a data stream file 144 (designated herein ".pds"). The output file 144 contains both the data values being represented, and its graphical correlations. The output file 144 can be electronically stored for subsequent reference.

Also, a visualization scene builder 146 receives input from the visualization model control module 136 for generating 3D graphical objects in response to the graphics definitions undertaken by the visualization model control module 136. The output of the scene builder 146 are 3D objects 148.

In addition, FIG. 10 shows that the open architecture of the present invention includes a user-developer application model 143, the purpose of which is to permit a user developer to specify new display models by augmenting the visualization model interface 138 and the standard user interface 140 to cause the visualization model control module 136 to produce the new display models. For example, a user developer might want to specify a bar chart model that has not been implemented in the system 10 purchased by the user developer. The user developer uses the interfaces 138, 140 to define in both alpha-numeric terms and in graphics the graphical shape and graphical attributes of the desired new model. With the above-described open architecture, the data visualization system 10 can include initial visualization models, each being characterized by predefined visual attributes, and a user developer of the system 10 can define a new model and then use the initial visualization models or the new visualization model.

FIG. 11 shows the architecture of the system 10 for transforming the 3D objects output by the architecture shown in FIG. 10 into 2D representations that can be presented on a flat display, such as the monitor 24 shown in FIG. 1. In general, a rendering engine 150 receives data structures in the form of 3D object information 152 as input and sends the objects 152 to a 2D interface 154. The 2D interface 154 also receives both animation ("AVI") and still graphics ("BMP") files 155 that can be modified by a user to modify flat surface images, e.g., to superimpose a logo on a 2D object such as a disc.

The 2D interface 154 combines the various inputs to present graphics that can be presented on a 2D monitor 24. In addition to driving the monitor 24, the output of the 2D interface 154 can be output in the form of AVI files 158, BMP files 160 (if no animation is to be used), or to the printer 26.

FIG. 11 shows that the 3D objects 152 can include mesh objects 162, i.e., objects such as bars, spheres, etc. that have volume. Also, in accordance with 3D graphics principles known in the art the 3D objects can include camera objects (i.e., points of apparent viewing perspective having 3D coordinates), lighting objects 166, and other 3D objects. The lighting objects 166 are points in space from which light is modelled to emanate, for, e.g., properly highlighting the graphics objects 48 shown in FIGS. 4 and 5.

With particular attention to the rendering engine 150, it is to be understood that the rendering engine 150 converts the 3D objects 152 into 2D objects that appear to have three spatial dimensions in accordance with 3D graphics means known in the art. To undertake this conversion, the rendering engine 150 includes subset application programming interfaces (API) 168,170,172, such as the freely distributed APIs known by the tradenames OpenGL, Direct3D, and VRML.

Figure 12:
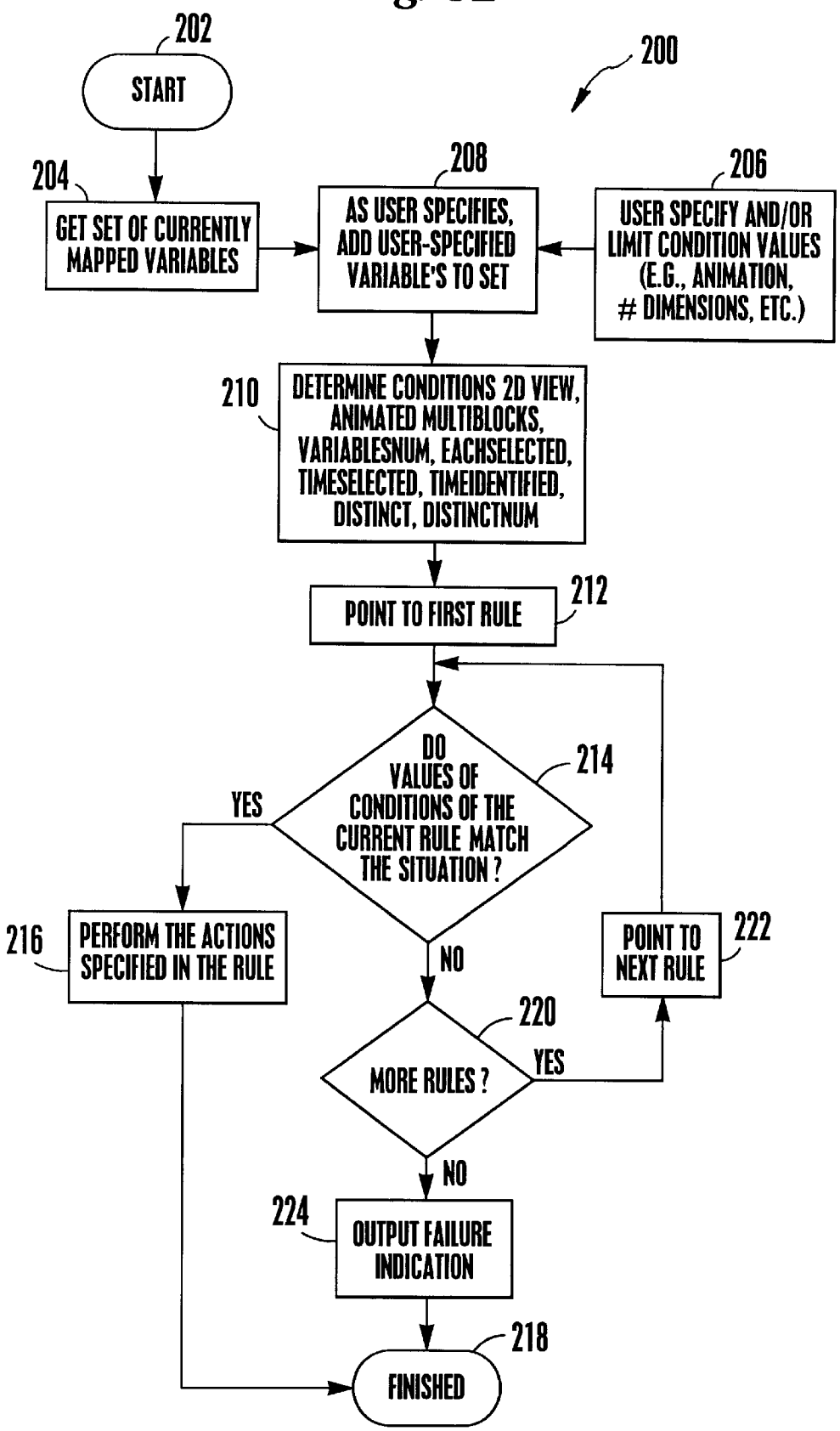
FIG. 12 is a flow chart showing the operation of the rule interpreter for automatically correlating database variables to graphics attributes.
Figure 13:
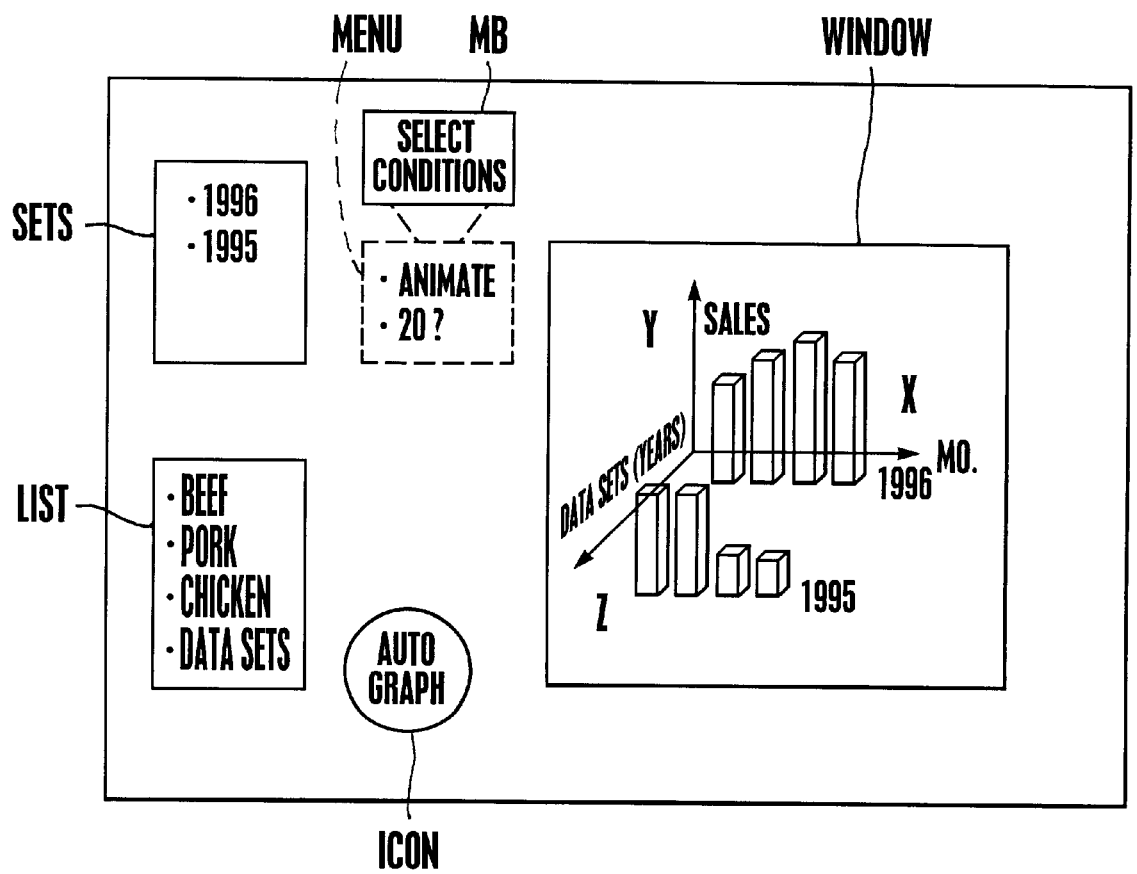
FIG. 13 is a view of the automatic graph mode screen.

Now referring to FIGS. 12 and 13 and Table 1, a computer-implemented automatic graphics generator, generally designated 200, can be understood. Per the present invention, using the graphics generator 200 a user can designate database variables and also designate one or more presentation condition elements, and based on the user's designations and on the database, the graphics generator 200 automatically correlates the user-selected database variables to a graphics presentation, using a set of correlation rules. In other words, the generator 200 automatically correlates variables with respective graphics attributes based on electronically stored correlation rules.

Commencing at start state 202 as invoked by, e.g., a user of the generator 200 clicking on an icon representing the generator 200, the logic of the graphics generator 200 moves to block 204 to retrieve some or all variables in the set of currently mapped variables, if any exist. More specifically, it might happen that the user has already correlated one or more variables to respective graphics attributes in accordance with the principles discussed above, and now desires the generator 200 to automatically correlate additional user-defined variables to respective additional graphics attributes.

At block 206, the generator 200 receives user inputs representative of one or more rule condition elements. In accordance with the present invention, a rule establishes a graphics presentation action, and a rule is invoked when a particular condition that is associated with the rule holds true. In turn, each condition is defined by particular values for a set of condition elements which, in the preferred embodiment, are a set of Boolean tests. As will be described in greater detail shortly, Table 1 illustrates a set of rules with associated conditions being respectively defined by particular values for the condition elements shown.

The inputs at block 206 can be received by, e.g., a user clicking on a drop-down menu bar "MB" on the automatic graph display shown in FIG. 13, and then selecting the values for particular condition elements on a menu "MENU". In the preferred embodiment, the user can select whether animation may be used and whether more than two dimensions can be used by appropriately toggling the respective condition element. Specifically, if "animation" is selected "NO" by the user, no animation will be presented; on the other hand, if "animation" is selected "yes", animation may, but not must, be invoked by the generator 200 as dictated by the selection of other conditions and variables. Likewise, the user can constrain the display to be two-dimensional or the user can permit the generator 200 to use more than two dimensions by appropriately toggling the "2D" button on the menu "MENU".

Once the global condition element values have been established at block 206, the logic moves to block 208 to permit the user to specify the additional variables to be graphed. In one embodiment, the user can specify a variable by clicking on the variable. in an alternate embodiment, the user can specify a variable by dragging and dropping the variable onto an automatic graphing (referred to herein as "autograph") icon. For example, as shown in FIG. 13 a variable list "LIST" can be presented, and the user can drag and drop one or more of the variables on the list, e.g., "beef", onto an autograph icon "ICON". Or, the user need simply click on "beef" to select it for presentation.

As recognized by the present invention and as shown in FIG. 13, a particular variable can be structured in sets in the database. As an example, sales of beef might be grouped by year, as indicated by a sets list "SETS". A user can define whether the graphical presentation is to be organized set by set by clicking on a "data sets" entry on the variable list "LIST".

From the above discussion, it will be appreciated that database variables that the user wishes the generator 200 to automatically correlate to graphics attributes for presentation are selected at block 208. It is to be understood that if desired, the user can also select database elements that are characterized by database variables. Thus, blocks 208 and/or 206 establish a user input receiver that accumulates a set of user-specified variables.

In any case, once the user has made the selections at block 208, the logic immediately adds the variables to the set of preexisting variables, if any, received at block 204, and then automatically proceeds to block 210. At block 210, the generator 200 ascertains values for the various condition elements shown in, for example, Table 1. It is to be understood that the rule condition elements can include more or less than the condition elements shown in, e.g., the exemplary rule table shown in Table 1.

As mentioned above, in one presently preferred embodiment, the rule condition elements include whether animation may be used and whether more than two dimensions may be presented, as established by the user at block 206. As also discussed above, certain other constraints tested by rule condition elements are defined by the user at block 208.

Specifically, the user identifies the variables selected for presentation at block 208, and one of the variables can be "time". Per the present invention, the user can specify which variable is to be considered to be time-related, or the generator 200 can infer time. For example, the generator 200 can infer a variable is time-related by searching through the database for a data sequence that appears as a time sequence, e.g., a sequence of data arranged by days, or months, or other time period. Or, the generator 200 can infer that a top row of data in a spreadsheet is time-related. With this in mind, it is to be appreciated that block 210 establishes a time-based variable detector for determining whether one or more of the variables is time-related.

Further, the user defines whether each data set of a particular variable is to be presented, as discussed above, thereby defining the value for yet another condition element, referred to in the drawings and tables as "multiple data sets" or "multBlocks".

Moreover, the user might select one or more variables that are distinct from other selected variables, in that the distinct variable has a scale that is different from the scales of selected non-distinct variables. As an example, the user might select "beef" having a scale in the millions of dollars along with a variable that reflect the percentage beef of total sales and thus, having a scale between zero and one hundred. In this example, the percentage of beef variable is distinct. Whether one or more such distinct variables have been selected is determined by the generator 200 at block 210.

In addition to the condition elements that depend on user selections, other condition elements depend on the database, and the values for these elements are automatically determined by the generator 200 at block 210. For example, the generator 200 determines whether any selected variable happens to be grouped in multiple data sets in the database, regardless of whether the user has explictly indicated that such groupings are to be displayed by clicking on the "data sets" entry of the variables list "LIST". Whether variables are in sets can be determined by, e.g., the generator 200 accessing the database that holds the variables and, based on the structure of the data stored therein, determine whether one or more variables is arranged in sets. Furthermore, the generator 200 can determine whether a time-related variable is to be presented.

Having established the variables desired to be presented and the values of the condition elements at block 210, the generator 200 next proceeds to block 212 to access a set of electronically stored correlation rules, and based thereon, automatically correlate the variables to respective graphics attributes for presentation of the graphics attributes and/or objects. Thus, as described below, the correlation rules are associated with correlation conditions.

More specifically, in cross-reference to FIGS. 12 and 13 and Table 1, the logic of the generator 200 moves from block 210 to block 212, wherein a first rule R1 in an ordered list or set 213 of correlation rules $R_j$ is pointed to, it being understood that j=integer in an ordered sequence from 1 to n, wherein n=number of rules in the list or set 213 (Table 1). As can be appreciated in reference to Table 1, each correlation rule $R_j$ correlates values of one or more condition elements $C_i$ in a set of i condition elements (i=integer in an ordered sequence from 1 to m, wherein m=number of conditions possible) to one or more graphics presentation actions.

In the particular embodiment shown, the first rule R1 outputs the graphics presentation action "place the variable on the x-axis" when a condition is established by following values for the following condition elements: "2D?" and "animated?" are negative, a single variable is selected, time is a designated variable, and no other condition elements are specified. It is to be understood, however, that the particular correlation rules $R_j$ used can be established as desired by the designer in accordance with the principles discussed herein, and that the rules $R_j$ shown in Table 1 are exemplary. It is to be further understood that while Table 1 shows rules for outputting stacked vertical bars or clustered vertical bars, similar rules can be used for outputting clustered horizontal bars and stacked horizontal bars by, e.g., reversing "x" axis and "y" axis actions. Also, rules can be developed for outputting a scatter plot. It is to be understood that rules can also be provided for outputting a pie chart, or other 2D or 3D representation, or other mapping from variables to sensory attributes discussed previously.

As can be appreciated in reference to FIG. 12, the generator 200 determines, at decision diamond 214, whether the values of the condition elements $C_i$ for invoking the rule $R_j$ under test match the situation, i.e., the conditions and values specified by the user or determined by the generator 200 under the principles set forth above. If a match is found, the process moves to block 216 to perform the graphics presentation actions of the rule, and then the process ends at state 218. An example of such a graphics presentation action is shown in the graphics window "WINDOW" of FIG. 13, in which bars representing sales of beef have been displayed on a 3-D graph, with the x-axis representing a time-related variable, namely, months, and the y-axis representing sales volume. Also, in the example shown it is assumed that user has designated "data sets", such that two sets of bars, one representing sales in 1995 and the other representing sales in 1996, are spread along the z-axis.

On the other hand, if, at decision diamond 214, it is determined that the conditions and values specified by the user or determined by the generator 200 do not match those associated with the rule $R_j$ under test, the logic moves to decision diamond 220 to determine whether any further rules $R_j$ remain to be tested. Stated differently, at decision diamond 220 it is determined whether j=m. If additional rules remain, the logic moves to block 222 to point to the next rule $R_{j+1}$ in the list or set 213 of rules, and then loops back to decision diamond 218. Otherwise, the process moves to block 224 to output a failure indication, such as the message "AutoGraph cannot present the requested display", and then ends at state 218. It may now be understood that the generator 200, at states 212–222, essentially correlates one or more graphics attributes (as embodied in the respective graphics actions) to respective database variables (as also embodied in the graphics actions) by accessing the list or set 213 of correlation rules shown in the Table.

While the particular USER-FRIENDLY GRAPHICS GENERATOR INCLUDING AUTOMATIC CORRELATION as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more".

TABLE 1

| Vertical Bars 2D | animated? | multiple data sets? | no. of variables chosen | "each" one of them? | "time" one of them? | is there a "time" variable identified? | are any of the chosen variables "distinct"? | are more than one of the chosen variables "distinct"? | "distinct" variables are: the only variable with or without a % format, or the only variable with or without a currency 1 |
|---|---|---|---|---|---|---|---|---|---|
| no | no | — | 1 | — | yes | — | — | — | place on $r_1$ |
| no | no | no | 1 | — | no | yes | — | — | place on y, spread time on x |
| no | no | no | 1 | — | no | no | — | — | place on y |
| no | no | yes | 1 | no | no | yes | — | — | place on y, spread time on x, spread each on z and color |
| no | no | yes | 1 | yes | no | yes | — | — | spread time on x, spread each on z and color |
| no | no | yes | 1 | no | no | no | — | — | place on y, spread each on z and color |
| no | no | yes | 1 | yes | no | no | — | — | spread each on z and color |
| no | no | — | 2 | — | yes | — | — | — | spread time on x, place other on y |
| no | no | no | 2 | — | no | yes | — | — | spread time on x, place other on y |
| no | no | no | 2 | — | no | no | no | — | place on y |
| no | no | no | 2 | — | no | no | yes | — | place first on x, place second on y |
| no | no | yes | 2 | no | no | yes | — | — | place on y, spread time on x, spread each on z and color |
| no | no | yes | 2 | yes | no | yes | — | — | place non-each on y, spread time on x, spread each on z and color |
| no | no | yes | 2 | no | yes | — | — | — | place non-time on y, spread time on x, spread each on z and color |
| no | no | yes | 2 | yes | yes | — | — | — | spread time on x, spread each on z and color |
| no | no | yes | 2 | no | no | no | — | — | place on y, spread each on x |
| no | no | yes | 2 | yes | no | no | — | — | place non-each on y, spread each on x |
| no | no | no | 3+ | — | yes | — | no | — | place non-time on y, spread time on x |
| no | no | no | 3+ | — | yes | — | yes | 0 | place non-time non-distinct on y, spread time on x, place distinct on z |
| no | no | yes | 3+ | no | yes | — | no | — | place non-time on y, spread time on x, spread each on z and color |
| no | no | yes | 3+ | yes | yes | — | no | — | place non-time non-each on y, spread time on x, spread each on z and color |
| no | no | yes | 3+ | no | yes | — | yes | 0 | place non-distinct on y, spread time on x, |

TABLE 1-continued

| Vertical Bars 2D | animated? | multiple data sets? | no. of variables chosen | "each" one of them? | "time" one of them? | is there a "time" variable identified? | are any of the chosen variables "distinct"? | are more than one of the chosen variables "distinct"? | "distinct" variables are: the only variable with or without a % format, or the only variable with or without a currency 1 |
|---|---|---|---|---|---|---|---|---|---|
| no | no | no | 3+ | — | no | yes | no | — | place distinct on z |
| no | no | no | 3+ | — | no | yes | yes | 0 | place non-time on y, spread time on x, place distinct on z |
| no | no | yes | 3+ | — | no | yes | no | — | place on y, spread time on x, spread each on z and color |
| no | no | yes | 3+ | — | no | no | no | — | place on y, spread each on x |
| no | no | yes | 3+ | — | no | no | yes | 0 | place non-distinct on y, place distinct on x, spread each on z and color |
| no | yes | — | 1 | — | yes | — | — | — | place on "time" |
| no | yes | no | 1 | — | no | yes | — | — | place on y, place time on "time" |
| no | yes | no | 1 | — | no | no | — | — | place on y |
| no | yes | yes | 1 | no | no | yes | — | — | place on y, spread each on x, place time on "time" |
| no | yes | yes | 1 | yes | no | yes | — | — | spread each on x, place time on "time" |
| no | yes | yes | 1 | no | no | no | — | — | place on y, spread each on x |
| no | yes | yes | 1 | yes | no | no | — | — | spread each on x |
| no | yes | no | 2 | — | yes | — | — | — | place non-time on y, place time on "time" |
| no | yes | yes | 2 | no | yes | — | — | — | place non-time on y, place time on "time" |
| no | yes | yes | 2 | yes | yes | — | — | — | spread each on x, place time on "time" |
| no | yes | no | 2 | — | no | yes | — | — | place non-time on y, place time on "time" |
| no | yes | no | 2 | — | no | no | no | — | place on y |
| no | yes | no | 2 | — | no | no | yes | — | place non-distinct on y, place distinct on x |
| no | yes | yes | 2 | no | no | yes | — | — | place on y, spread each on x, place time on "time" |
| no | yes | yes | 2 | yes | no | yes | — | — | place non-each on y, spread each on x, place time on "time" |
| no | yes | yes | 2 | no | yes | — | — | — | place non-time on y, spread each on x, place time on "time" |
| no | yes | yes | 2 | yes | yes | — | — | — | spread each on x, place time on "time" |
| no | yes | yes | 2 | no | no | no | — | — | place on y, spread each on x |
| no | yes | yes | 2 | yes | no | no | — | — | place non-time on y, spread each on x |
| no | yes | no | 3+ | — | yes | — | no | — | place non-time on y, place time on "time" |
| no | yes | no | 3+ | — | yes | — | yes | 0 | place non-distinct on y, place distinct on x |
| no | yes | no | 3+ | — | yes | — | yes | 2+ | place non-distinct on y, place first distinct on x, place second distinct on z |
| no | yes | yes | 3+ | no | yes | — | no | — | place non-time on y, place time on "time" |
| no | yes | yes | 3+ | yes | yes | — | no | — | place non-time non-each on y, spread each on x, place time on "time" |
| no | yes | yes | 3+ | no | yes | — | yes | 0 | place non-time non-distinct on y, place distinct on x, place time on "time" |
| no | yes | yes | 3+ | yes | yes | — | yes | 0 | place non-time non-distinct non-each on y, place distinct on x, place time on "time", spread each on z and color |
| no | yes | yes | 3+ | no | yes | — | yes | 2+ | place non-time non-distinct on y, place first distinct on x, place second distinct on z |
| no | yes | no | 3+ | — | no | yes | no | — | place on y, place time on "time" |
| no | yes | no | 3+ | — | no | yes | yes | 0 | place non-distinct on y, place distinct on x, place time on "time" |
| no | yes | yes | 3+ | no | yes | no | no | — | place on y, place time on "time", spread each on x |
| no | yes | yes | 3+ | no | yes | yes | yes | 0 | place non-distinct on y, place distinct on x, place time on "time", spread each on z and color |
| no | yes | yes | 3+ | no | no | yes | yes | 2 | place non-distinct on y, place first distinct on x, place second distinct on z, place time on "time" |
| no | yes | yes | 3+ | no | no | no | no | — | place on y, spread each on x |
| no | yes | yes | 3+ | no | no | yes | yes | 0 | place non-distinct on y, place distinct on x, spread each on z and color |
| yes | no | — | 1 | — | yes | — | — | — | spread on x |
| yes | no | no | 1 | — | no | yes | — | — | place on y, spread time on x |
| yes | no | no | 1 | — | no | no | — | — | place on y |
| yes | no | yes | 1 | no | no | yes | — | — | place on y for each value of "each", spread time on x |
| yes | no | yes | 1 | yes | no | yes | — | — | spread on y, spread time on x |
| yes | no | yes | 1 | no | no | no | — | — | place on y for each value of "each" |
| yes | no | yes | 1 | yes | no | no | — | — | spread on x |
| yes | no | — | 2 | — | yes | — | — | — | spread non-time on y, spread time on x |
| yes | no | no | 2 | — | no | yes | — | — | spread non-time on y, spread time on x |
| yes | no | no | 2 | — | no | no | no | — | place on y |
| yes | no | no | 2 | — | no | no | yes | — | place first on x, place second on y |
| yes | no | yes | 2 | no | no | yes | — | — | place on y for each value of "each", |

TABLE 1-continued

| Vertical Bars 2D | animated? | multiple data sets? | no. of variables chosen | "each" one of them? | "time" one of them? | is there a "time" variable identified? | are any of the chosen variables "distinct"? | are more than one of the chosen variables "distinct"? | "distinct" variables are: the only variable with or without a % format, or the only variable with or without a currency 1 |
|---|---|---|---|---|---|---|---|---|---|
| yes | no | yes | 2 | yes | no | yes | — | — | spread time on x |
| yes | no | yes | 2 | no | yes | — | — | — | place non-each on y for each value of "each", spread time on x |
| yes | no | yes | 2 | yes | yes | — | — | — | place non-time on y for each value of "each", spread time on x |
| yes | no | yes | 2 | no | no | no | — | — | spread time on x, spread each on y |
| yes | no | yes | 2 | yes | no | no | — | — | place on y, spread each on x |
| yes | no | no | 3+ | — | yes | — | no | — | place non-each on y, spread time on x |
| yes | no | yes | 3+ | no | yes | — | no | — | place non-time on y, spread time on x |
| yes | no | yes | 3+ | yes | yes | — | no | — | place non-time on y for each value of "each", spread time on x |
| yes | no | no | 3+ | — | no | yes | no | — | place non-time non-each on y for each value of "each", spread time on x |
| yes | no | no | 3+ | — | no | yes | yes | 0 | place non-time on y, spread time on x |
| yes | no | yes | 3+ | — | no | yes | no | — | place non-distict on y, place distinct on x |
| yes | no | yes | 3+ | — | no | no | no | — | place on y, spread each on x |
| yes | yes | — | 1 | — | yes | — | — | — | place on y, spread each on x |
| yes | yes | no | 1 | — | no | yes | — | — | place on "time" |
| yes | yes | no | 1 | — | no | no | — | — | place on y, place time on "time" |
| yes | yes | yes | 1 | no | no | yes | — | — | place on y |
| yes | yes | yes | 1 | yes | no | yes | — | — | place on y, spread each on x, place time on "time" |
| yes | yes | yes | 1 | no | no | no | — | — | spread each on x, place time on "time" |
| yes | yes | yes | 1 | yes | no | no | — | — | place on y, spread each on x |
| yes | yes | no | 2 | — | yes | — | — | — | spread each on x |
| yes | yes | yes | 2 | no | yes | — | — | — | place non-time on y, place time on "time" |
| yes | yes | yes | 2 | yes | yes | — | — | — | place non-time on y, place time on "time" |
| yes | yes | no | 2 | — | no | yes | — | — | spread each on x, place time on "time" |
| yes | yes | no | 2 | — | no | no | no | — | place on y, place time on "time" |
| yes | yes | no | 2 | — | no | no | yes | — | place on y |
| yes | yes | yes | 2 | no | no | yes | — | — | place first on x, place second on y |
| yes | yes | yes | 2 | yes | no | yes | — | — | place on y, spread each on x, place time on "time" |
| yes | yes | yes | 2 | no | yes | — | — | — | place non-each on y, spread each on x, place time on "time" |
| yes | yes | yes | 2 | yes | yes | — | — | — | place non-time on y, spread each on x, place time on "time" |
| yes | yes | yes | 2 | no | no | no | — | — | spread each on x, place time on "time" |
| yes | yes | yes | 2 | yes | no | no | — | — | place on y, spread each on x |
| yes | yes | no | 3+ | — | yes | — | no | — | place non-each on y, spread each on x |
| yes | yes | no | 3+ | — | yes | — | yes | 0 | place non-time on y, place time on "time" |
| yes | yes | yes | 3+ | no | yes | — | no | — | place non-distinct on y, place distinct on x, place time on "time" |
| yes | yes | yes | 3+ | yes | yes | — | no | — | place non-time on y, place time on "time" |
| yes | yes | yes | 3+ | no | yes | — | yes | 0 | place non-time non-each on y, spread each on x, place time on "time" |
| yes | yes | no | 3+ | — | no | yes | no | — | place non-time non-distinct on y, place distinct on x, place time on "time" |
| yes | yes | no | 3+ | — | no | yes | yes | 0 | place on y, place time on "time" |
| yes | yes | yes | 3+ | — | no | yes | no | — | place non-distinct on y, place distinct on x, place time on "time" |
| yes | yes | yes | 3+ | — | no | no | no | — | place non-each on y, spread each on x, place time on "time" |
| yes | yes | yes | 3+ | no | no | no | yes | 0 | place on y, spread each on x |
| yes | yes | yes | 3+ | no | no | no | yes | 0 | place non-distinct on y, place distinct on x |

What is claimed is:

1. A computer-based system for generating, for presentation on one or more displays, graphics representative of elements in a database, each element being characterized by one or more variables, comprising:
   a computer program product having computer readable code thereon to enable a computing device to undertake the steps of:
   presenting, on the display, a variable list of at least some of the variables;
   presenting, on the display, a graphical list of at least some graphics attributes of at least one non-alpha numeric graphics object selected from the group of objects consisting of spheres, pies, and bars;
   permitting a user to correlate at least some of the variables to respective graphics attributes by clicking on graphics attributes in the graphical list and dragging the attributes over respective variables on the variable list; and
   presenting on the display the graphics object or objects, based on the correlation of variables to graphics attributes such that the graphics object or objects have spatial characteristics that are defined by the respective variables, the graphics object being displayed with the lists.

2. The system of claim 1, wherein the permitting step includes permitting a user to correlate any variable with any graphics attribute.

3. The system of claim 1, wherein the computer program product is programmed to further undertake the step of presenting a legend of variables with the graphical list in response to an output of the permitting step.

4. The system of claim 1, wherein the computer program product is programmed to further undertake the step of presenting an element list of at least some of the elements, the element list being presented with the graphical list.

5. The system of claim 1, wherein one of the graphics attributes is any sequence over time.

6. The system of claim 1, wherein the sequence is a variable having time values.

7. The system of claim 1, wherein the lists and graphics objects are presented on the display simultaneously with each other, and wherein the graphics objects are manipulated directly by means of the permitting step.

8. The system of claim 1, wherein the graphics object is characterized by a shape, and the computer program product is programmed to further undertake the step of permitting a user to determine at least one of: the shape of the graphics object, and the graphics attributes.

9. The system of claim 1, wherein the graphics attributes are selected from the group of attributes including: spatial dimension, time, graphics object rotation, graphics object color, graphics object size, graphics object opacity, graphics object visual texture, graphics object visual finish.

10. The system of claim 1, wherein the computer readable code accesses a set of correlation rules, and based at least in part thereon automatically correlates at least some of the variables to respective graphics attributes.

11. The system of claim 10, wherein the automatically correlating act automatically correlates variables with respective graphics attributes based on at least one electronically stored correlation rule.

12. The system of claim 10, wherein at least some correlation rules are associated with at least some correlation conditions, a correlation condition being defined by respective condition elements, and wherein at least some inputs can be received representing one or more condition elements.

13. The system of claim 12, wherein the correlation condition elements include one or more of:
(a) whether the user permits animation; (b) whether a time-related variable is to be presented; (c) the number of variables to be presented; (d) whether one or more variables to be graphed refers to a set of data; (e) whether plural data sets for a first variable are to be presented; (f) whether a distinct variable exists in that the distinct variable cannot be depicted on the same scale as at least a non-distinct variable; and (g) a limit on the number of spatial dimensions to be presented.

14. The system of claim 10, wherein the computer program product further includes computer readable code thereon to enable a computing device to undertake the act of determining whether one or more of the variables is time related.

15. The system of claim 10, wherein each rule outputs a respective graphics presentation action.

* * * * *